United States Patent
Roake et al.

(10) Patent No.: US 10,796,006 B2
(45) Date of Patent: Oct. 6, 2020

(54) GEOGRAPHICAL TRACK DATA OBFUSCATION

(71) Applicant: EntIT Software LLC, Sunnyvale, CA (US)

(72) Inventors: Timothy Roake, Sunnyvale, CA (US); Cheryl He, Sunnyvale, CA (US); Luther Martin, Sunnyvale, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 306 days.

(21) Appl. No.: 15/693,043

(22) Filed: Aug. 31, 2017

(65) Prior Publication Data

US 2019/0065758 A1 Feb. 28, 2019

(51) Int. Cl.
*G06F 21/60* (2013.01)
*G06F 21/62* (2013.01)
(Continued)

(52) U.S. Cl.
CPC ........ *G06F 21/602* (2013.01); *G06F 21/6254* (2013.01); *H04L 9/0631* (2013.01); *H04L 9/14* (2013.01); *G06F 2221/2125* (2013.01)

(58) Field of Classification Search
CPC ..... H04L 63/1433; H04L 9/0631; H04L 9/14; H04L 5/0007; H04L 5/026; G06Q 10/0635; G06F 3/011; G06F 3/0304; G06F 3/0416; G06F 3/165; G06F 3/0346; G06F 21/602; G06F 21/6254; G06F 2221/2125; G06F 21/60; G06F 21/62
See application file for complete search history.

(56) References Cited

U.S. PATENT DOCUMENTS

| 6,885,748 | B1 | 4/2005 | Wang |
| 7,047,222 | B1 * | 5/2006 | Bush ................. G06Q 20/102 705/1.1 |

(Continued)

FOREIGN PATENT DOCUMENTS

| CN | 105791292 | 7/2016 |
| JP | 2000004482 | 1/2000 |

OTHER PUBLICATIONS

Zhu et al., Query with SUM Aggregate Function on Encrypted Floating-Point Numbers in Cloud, Journal of information processing systems, vol. 13, No. 3, pp. 573-589, Jun. 2017 (Year: 2017).*

(Continued)

*Primary Examiner* — Alexander Lagor
*Assistant Examiner* — Howard H. Louie

(57) ABSTRACT

In some examples, geographical track data obfuscation may include ascertaining geographical data points that include a first data point and subsequent data points. For each of the subsequent data points, a delta degree value may be determined as a difference between a subsequent data point and a corresponding previous data point. A first format preserving encryption (FPE) may be applied to encrypt longitude and latitude values of the first data point. A second FPE may be applied by applying a translation of a plurality of translations to encrypt each delta degree value. A total distance traveled, a total time, and/or a total elevation gain may be extracted from the encrypted first data point and the encrypted delta degree values.

20 Claims, 8 Drawing Sheets

(51) Int. Cl.
 *H04L 9/06* (2006.01)
 *H04L 9/14* (2006.01)

(56) References Cited

U.S. PATENT DOCUMENTS

| | | | |
|---|---|---|---|
| 9,087,216 B2 | 7/2015 | LaFever et al. | |
| 9,397,983 B2 | 7/2016 | Moffat | |
| 10,032,069 B2* | 7/2018 | Mizuochi | A61B 5/11 |
| 2005/0124319 A1* | 6/2005 | Williams | H04L 63/0492 |
| | | | 455/411 |
| 2010/0091907 A1* | 4/2010 | Noh | H04J 13/0062 |
| | | | 375/302 |
| 2010/0194622 A1* | 8/2010 | Clingman | G01S 13/765 |
| | | | 342/37 |
| 2014/0050262 A1* | 2/2014 | Sakurai | H04N 19/176 |
| | | | 375/240.03 |

OTHER PUBLICATIONS

Hu et al., Homomorphic Proximity Computation in Geosocial Networks, INFOCOM Workshops 2016, p. 616-621. (Year: 2016).*
Kachore et al. "Location Obfuscation for Location Data Privacy," 2015 IEEE World Congress on Services, pp. 213-220, 2015 (Year: 2015).*
Liechti et al., Format Preserving Encryption, Bachelor Thesis, Bern University of Applied Sciences, Dec. 6, 2015 (hereinafter "Liechti"), (Year: 2015).*
Agrawal, R. et al., "Order Preserving Encryption for Numeric Data", IBM Almaden Research Center, Jun. 13-18, 2004, Paris, France, pp. 12. https://pdfs.semanticscholar.org/8776/c004a351e23be9ef7a4d214da4fc93260484.pdf.

* cited by examiner

| Transform Index | x transform | y transform | example lat/long | transformed lat/long |
|---|---|---|---|---|
| 0 | 1 | 1 | 0.003/0.004 | 0.003/0.004 |
| 1 | 1 | -1 | 0.003/0.004 | 0.003/-0.004 |
| 2 | -1 | 1 | 0.003/0.004 | -0.003/0.004 |
| 3 | -1 | -1 | 0.003/0.004 | -0.003/-0.004 |

FIG. 3

| Original lat/long delta | Track index number | Track index mod 4 | Short FPE with Modification | Transformation pair | Transformed lat/long values |
|---|---|---|---|---|---|
| 0.00012/0.00037 | 125 | 1 | 3 | -1, -1 | -0.00012/-0.00037 |
| 0.00079/0.00011 | 126 | 2 | 1 | 1, -1 | 0.00079/-0.00011 |
| 0.00038/0.00051 | 127 | 3 | 0 | 1, 1 | 0.00038/0.00051 |
| 0.00099/0.00002 | 128 | 0 | 2 | -1, 1 | -0.00099/0.00002 |

```
┌─────────────────────────────────────────────────────────┐
│ ASCERTAIN GEOGRAPHICAL DATA POINTS THAT INCLUDE A FIRST │
│         DATA POINT AND SUBSEQUENT DATA POINTS           │
│                          702                            │
└─────────────────────────────────────────────────────────┘
                            ▼
┌─────────────────────────────────────────────────────────┐
│ FOR EACH OF THE SUBSEQUENT DATA POINTS, DETERMINE A DELTA│
│  DEGREE VALUE AS A DIFFERENCE BETWEEN A SUBSEQUENT DATA │
│         POINT AND A CORRESPONDING PREVIOUS DATA POINT   │
│                          704                            │
└─────────────────────────────────────────────────────────┘
                            ▼
┌─────────────────────────────────────────────────────────┐
│  APPLY A FIRST FORMAT PRESERVING ENCRYPTION (FPE) TO    │
│  ENCRYPT LONGITUDE AND LATITUDE VALUES OF THE FIRST DATA│
│                         POINT                           │
│                          706                            │
└─────────────────────────────────────────────────────────┘
                            ▼
┌─────────────────────────────────────────────────────────┐
│ APPLY A SECOND FPE BY APPLYING A TRANSLATION OF A PLURALITY│
│  OF TRANSLATIONS TO ENCRYPT EACH DELTA DEGREE VALUE BY  │
│  TRANSFORMING EACH LONGITUDE AND LATITUDE PAIR OF EACH  │
│                    DELTA DEGREE VALUE                   │
│                          708                            │
└─────────────────────────────────────────────────────────┘
                            ▼
┌─────────────────────────────────────────────────────────┐
│   APPLY A THIRD FPE TO A SET THAT INCLUDES EACH ENCRYPTED│
│                    DELTA DEGREE VALUE                   │
│                          710                            │
└─────────────────────────────────────────────────────────┘
                            ▼
┌─────────────────────────────────────────────────────────┐
│  EXTRACT A TOTAL DISTANCE TRAVELED, A TOTAL TIME, AND/OR A│
│ TOTAL ELEVATION GAIN FROM THE ENCRYPTED FIRST DATA POINT│
│       AND THE ENCRYPTED SET OF DELTA DEGREE VALUES      │
│                          712                            │
└─────────────────────────────────────────────────────────┘
```

FIG. 7

GEOGRAPHICAL TRACK DATA OBFUSCATION

BACKGROUND

Geographical data may include various types of information related to movement. For example, geographical data may include information related to a start location of a person's movement, an end location of the person's movement, and intermediate points between the start and end locations. The geographical data may be analyzed to determine various types of information with respect to the person's movement.

BRIEF DESCRIPTION OF DRAWINGS

Features of the present disclosure are illustrated by way of example and not limited in the following figure(s), in which like numerals indicate like elements, in which:

FIG. 3 illustrates transformation related to delta degree values to illustrate operation of the geographical track data obfuscation apparatus of FIG. 1;

FIG. 4 illustrates transformation related to delta degree values to illustrate operation of the geographical track data obfuscation apparatus of FIG. 1;

FIG. 7 illustrates an example flowchart of a method for geographical track data obfuscation.

DETAILED DESCRIPTION

Figure 1:
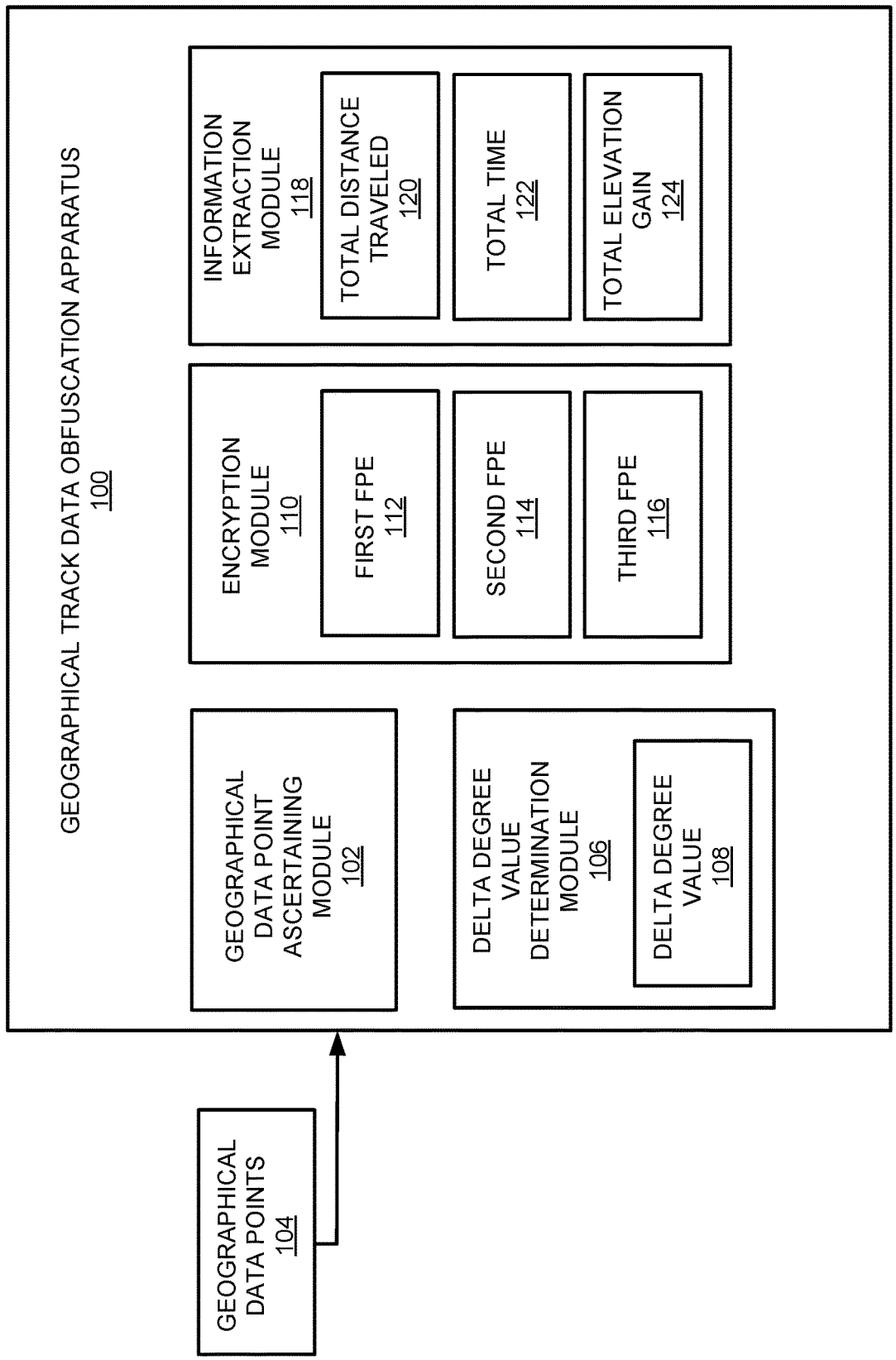
FIG. 1 illustrates an example layout of a geographical track data obfuscation apparatus.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Geographical track data obfuscation apparatuses, methods for geographical track data obfuscation, and non-transitory computer readable media having stored thereon machine readable instructions to provide geographical track data obfuscation are disclosed herein. The apparatuses, methods, and non-transitory computer readable media disclosed herein provide for generation of a difference-oriented and permuted data set that fully encrypts and confuses absolute data and individual tracks of a user. For example, the absolute data may include geographical data points that represent a track. Further, the geographical data points may include time, latitude, longitude, and elevation information. With respect to the encrypted absolute data, total distance, total time, and total elevation gain, which may be considered to be non-sensitive information, may be recovered (e.g., extracted). In this manner, the privacy of a user that generates an individual track including the geographical data points may be preserved.

With respect to geographical track data obfuscation, accumulation and storage of time sequential geographical location data is becoming more common with the advent of tracking and computing devices, with a common application being individuals tracking their physical activity. Each geographical data point may include time, latitude, longitude and elevation information, but this information may include personal data identifying, for example, an individual's home address and times they are absent. This type of data may be secured by encryption. However, once the data is encrypted, it is technically challenging to extract relevant information from the data. For example, it is technically challenging to extract non-sensitive metrics such as total distance, total time, and elevation gain.

In order to address at least these technical challenges related to extraction of metrics such as total distance, total time, and elevation gain, the apparatuses, methods, and non-transitory computer readable media disclosed herein provide for encryption and obfuscation of the geographical track data in a way that permits extraction of such underlying metrics. For example, the geographical track data obfuscation as disclosed herein may include the application of format preserving encryption (FPE) to an initial data point's latitude and longitude within limits that do not cause non-linearity errors in delta points as disclosed herein. The FPE may be described as encryption in such a way that an output (e.g., ciphertext) is in the same format as the input (e.g., plaintext). The deltas (differences) between subsequent points may be determined, and a set of these points with the time delta, elevation gain delta, and latitude and longitude delta may be generated. A short-FPE transform may be applied to the latitude and longitude deltas at each point to obfuscate direction. An FPE may be applied to the complete set of delta points to obfuscate the time and elevation gains. This process may be reversed, and the original data may be regained if a user has access to the secret key used in the FPE permutations.

According to an example, the apparatuses, methods, and non-transitory computer readable media disclosed herein provide encryption of a plurality of geographical data points that include a first data point and a plurality of subsequent data points. For example, the plurality of geographical data points may include time, latitude, longitude, and elevation information. For each of the subsequent data points, a delta degree value may be determined as a difference between a subsequent data point and a corresponding previous data point. A first FPE may be applied to encrypt longitude and latitude values of the first data point. A second (e.g., different) FPE may be applied by applying a translation of a plurality of translations to encrypt each delta degree value. A third (e.g., different) FPE may be applied to a set that includes each encrypted delta degree value. A total distance traveled, a total time, and/or a total elevation gain may be extracted from the encrypted first data point and set of delta degree values.

For the apparatuses, methods, and non-transitory computer readable media disclosed herein, modules, as described herein, may be any combination of hardware and programming to implement the functionalities of the respective modules. In some examples described herein, the combinations of hardware and programming may be implemented in a number of different ways. For example, the programming for the modules may be processor executable instructions stored on a non-transitory machine-readable storage medium and the hardware for the modules may include a processing resource to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

FIG. 1 illustrates an example layout of a geographical track data obfuscation apparatus (hereinafter also referred to as "apparatus 100").

Referring to FIG. 1, the apparatus 100 may include a geographical data point ascertaining module 102 to ascertain geographical data points 104 that include a first data point and subsequent data points.

A delta degree value determination module 106 is to determine, for each of the subsequent data points, a delta degree value 108 as a difference between a subsequent data point and a corresponding previous data point.

An encryption module 110 is to apply a first format preserving encryption (FPE) 112 to encrypt longitude and latitude values of the first data point. The encryption module 110 is to apply a second FPE 114 by applying a translation of a plurality of translations to encrypt each delta degree value. The encryption module 110 is to apply a third FPE 116 to a set that includes each encrypted delta degree value. According to an example, the first FPE, the second FPE, and the third FPE are each different FPEs.

According to an example, the encryption module 110 is to apply the first FPE 112 to encrypt the longitude value of the first data point by permuting the longitude value to a new longitude value within a range of −180 degrees to 180 degrees.

According to an example, the encryption module 110 is to apply the first FPE 112 to encrypt the latitude value of the first data point by permuting the latitude value to a new latitude value within a range of 90 degrees south to 90 degrees north.

According to an example, the encryption module 110 is to apply the second FPE 114 by applying a translation of four translations to transform each longitude and latitude pair of each delta degree value.

According to an example, the encryption module 110 is to apply the third FPE 116 to the set that includes each encrypted delta degree value to reorder an arrangement of each encrypted delta degree value in the set that includes each encrypted delta degree value.

An information extraction module 118 is to extract a total distance traveled 120, a total time 122, and/or a total elevation gain 124 from the encrypted first data point and the encrypted set of delta degree values.

According to an example, each data point of the geographical data points 104 may include time, latitude, longitude, and elevation information. In this regard, for the total distance traveled, the information extraction module 118 is to extract the total distance traveled 120 by determining a sum of a length of each hypotenuse determined for each encrypted delta degree value from the encrypted set of delta degree values.

According to an example, the information extraction module 118 is to extract the total time 122 by determining a sum of each time delta for each encrypted delta degree value from the encrypted set of delta degree values.

According to an example, the information extraction module 118 is to extract the total elevation gain 124 by determining a sum of each positive elevation gain for each encrypted delta degree value from the encrypted set of delta degree values.

Operation of the apparatus 100 is described in further detail with reference to FIGS. 1-5.

Referring to FIG. 1, the geographical track data obfuscation as disclosed herein may use delta, or difference, techniques to encode the geographical data points 104 (which may also be referred to as geographical track data). The first data point may be stored, and all other data points may be stored as a delta from the previous point. For example, a track that includes a plurality of geographical data points 104 may be specified as follows, and denoted Original Track:

point0(lat0,long0)→point1(lat1,long1)→point2(lat2, long2)→point3(lat3,long3)→point4(lat4,long4)

This Original Track may be represented as a Delta Track with delta degree values as follows:

point0(lat0,long0)→delta0(x0, y0)→delta1(x1, y1)→delta2(x2, y2)→delta3(x3, y3)

For the Delta Track, the values may represent a difference in degrees.

The first data point in the Delta Track may remain a latitude and longitude point indicating starting point. The first data point may not be encrypted to hide the start position, but the encryption may need to be performed differently for latitude values versus longitude value.

For example, as disclosed herein, the encryption module 110 is to apply the first FPE 112 to encrypt the longitude value of the first data point by permuting the longitude value to a new longitude value within a range of −180 degrees to 180 degrees. In this regard, longitude determines where a point is in a circular east-west path around the world, and ranges from −180 degrees to +180 degrees from the Prime Meridian (which passes through Greenwich, England). In order to hide the initial longitude point, the first data point may undergo encryption using the first FPE 112 to permute the value of the first data point to a new value within the −180 degrees to 180 degrees range. For example, assuming that the longitude value at Bondi in Australia is 151.3 degrees east. If this is the start value, then an FPE permutation may shift this longitude value to Santiago, Chile at 70.5 degrees west.

With respect to latitude, as disclosed herein, the encryption module 110 is to apply the first FPE 112 to encrypt the latitude value of the first data point by permuting the latitude value to a new latitude value within a range of 90 degrees south to 90 degrees north. In this regard, the latitude of the initial point (ranges between 90 degrees south and 90 degrees north) may also be FPE permuted, but over a relatively small range of degrees. This is because of the non-linear effects in relation to distances between longitudinal (east-west) points at different latitudes. For example, one degree east-west at the equator may be approximately 69 miles. At 40 degrees north or south, the distance between one degree east-west may be approximately 53 miles, and at the north and south poles, the distance may diminish to zero. Thus, when trying to obfuscate the start point in the north-south direction, the latitude value may need to be permuted such that the x values (a difference in degrees) still represent a physical distance close to the original distance. For example, assuming that a movement of 0.001 degrees east to west at the equator is approximately 100 yards, but the FPE encryption results in movement close to the south pole where 0.1 degrees east-west may be approximately two inches, the delta longitude value (east-west degrees) may not represent the distance that is traveled at the equator.

Referring again to FIG. 1, as disclosed herein, the encryption module 110 is to apply the second FPE 114 by applying a translation of four translations to transform each longitude and latitude pair of each delta degree value. In this regard, a geographical track, even if it has been geographically moved as disclosed herein with respect to application of the first FPE 112, may still show the shape of the path taken. In this regard, it may be possible to perform an "attack-match" with known common routes around the world to identify the path taken. In order to obfuscate the path taken, but still maintain the underlying metric of distance traveled, a permuting of the direction of delta elements at each point may be implemented by application of the second FPE 114.

Figure 2:
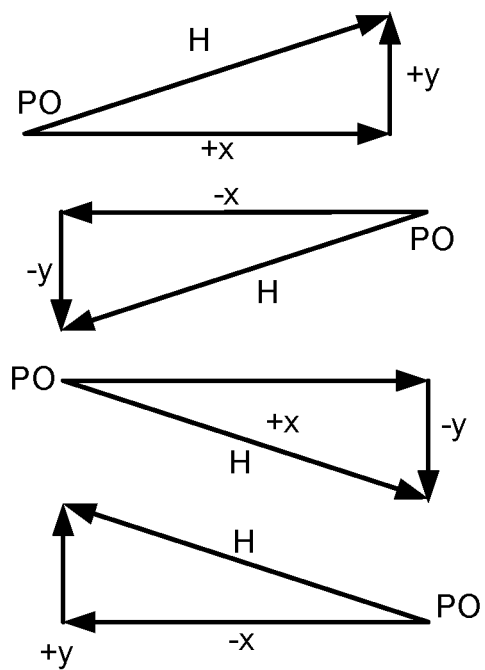
FIG. 2 illustrates encryption of delta degree values to illustrate operation of the geographical track data obfuscation apparatus of FIG. 1.

The application of the second FPE 114 may be based on the premise that when starting at a point and then travelling to another point that is, for example, 40 feet north and 30 feet west, then the total distance may be determined as the hypotenuse, in this case 50 feet. Alternatively, when travelling 40 feet north and 30 feet east, the distance would still remain the same, but the end point location would be different. Similarly when travelling 40 feet south and 30 feet east or west, the distance travelled would be 50 feet on the hypotenuse. In this regard, FIG. 2 illustrates encryption of delta degree values to illustrate operation of the apparatus 100. Referring to FIG. 2, the initial track point is P0, and the track moves +x and +y units resulting in hypotenuse H. As shown in FIG. 2, it can be seen that moving (−x,−y), (−x, +y) or (x, −y) also results in the same length hypotenuse H.

This transformation may be performed on each track delta point using "Short FPE" that represents a version of format preserving encryption that permutes relatively small numbers, in this case the number set (0, 1, 2, 3), where one of the four translations would be applied to each point based on a Short FPE with a modification using the data point index to give 0, 1, 2, or 3. The delta points would then be transformed based on a mapping to one of the four possibilities (e.g., 0, 1, 2, or 3).

The selected transformation may be determined by applying the FPE process to the modulus 4 of the track index, using the index as a modification value. For example, track point 125 mod 4=1, and this would be applied to the function F4_ShortFPE(1, 125). This would result in a random value of 0, 1, 2, or 3 (but would also be fully reversible by re-applying the F4_ShortFPE function).

With respect performing short FPE on a limited set of values such as 0, 1, 2, 3, the short FPE provides for permuting of the set 0, 1, 2, 3 to itself, and use of the results to modify some other set or tuple of values. In the case, for a list of tuples such as a relatively large set of geographical track latitude and longitude values (e.g., the geographical data points 104), the permuting of the values may be accomplished by multiplying the values by 1 or −1. The latitude and longitude deltas may include two values, and these values may be transformed in one of four ways as described above. The application of the short FPE provides a randomness of transformation, where, in this case 0 may permute to 3, 1 may permute to 2, 2 may permute to 0, and 3 may permute to 1. With a list of values, its index may be used to obtain the base value by taking the modulus base 4 of the value. Thus, "125 mod 4" becomes 1, "126 mod 4" becomes 2 etc. The $1^{st}$, $5^{th}$, 9th, $13^{th}$, etc. values may include the same FPE permuted value. In this case, another value may be used in the FPE process to randomize the output, and this may be denoted the modification value as discussed above. The modification value in this case is the index itself.

FIG. 3 illustrates transformation related to delta degree values to illustrate operation of the apparatus 100.

Referring to FIG. 3, the generated random value 0, 1, 2, or 3 may be used to apply the transform as shown in FIG. 3 to each latitude and longitude pair.

FIG. 4 illustrates transformation related to delta degree values to illustrate operation of the apparatus 100.

Referring to FIGS. 3 and 4, applying the transform of FIG. 3 to various data points results in the transformed track delta point values as shown in FIG. 4.

The application of the Short FPE as discussed above with reference to FIGS. 1, 3, and 4 results in a data set with transformed deltas at each point as follows:

point0(lat0,long0)→delta0(xt0, yt0)→delta1(xt1, yt1) →delta2(xt2, yt2)→delta3(xt3, yt3)

Because of the random nature of the transformations, if this track were to be drawn out, the track may generate a random track approximately circling the origination point, and thus the track may not be mapped to any know track, which would defeat a track attack-match as discussed above.

Figure 5:
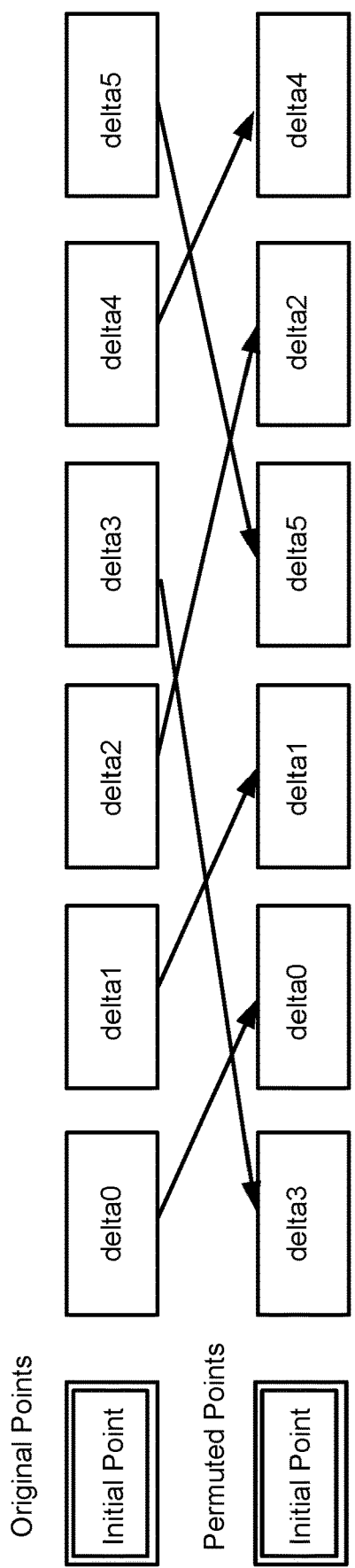
FIG. 5 illustrates application of format preserving encryption to a set that includes encrypted delta degree values to illustrate operation of the geographical track data obfuscation apparatus of FIG. 1.

FIG. 5 illustrates application of format preserving encryption to a set that includes encrypted delta degree values to illustrate operation of the apparatus 100.

Referring again to FIG. 1, as disclosed herein, the encryption module 110 is to apply the third FPE 116 to the set that includes each encrypted delta degree value to reorder an arrangement of each encrypted delta degree value in the set that includes each encrypted delta degree value. In this regard, each of the geographical data points 104 may be used to generate latitude and longitude deltas, as well as time and elevation deltas. It may be possible to analyze the time and elevation deltas to map to other known tracks' times and elevations. In order to defeat this type of attack, the actual list of points may be FPE permuted over the entire set by application of the third FPE 116 to thus randomly reorder the delta points as shown in FIG. 5.

Referring again to FIG. 1, as disclosed herein, the information extraction module 118 is to extract the total distance traveled 120, the total time 122, and/or the total elevation gain 124 from the encrypted first data point and the encrypted set of delta degree values. In this regard, the total distance traveled 120, the total time 122, and/or the total elevation gain 124 may be extracted from the final data set, without the need to decrypt and unobfuscate the data.

For example, given (Xn, Yn) that represent a delta at the n'th element, Tn that represents the time delta at the n'th element, and En that represents the elevation gain at the n'th element, then the information extraction module 118 is to extract the total distance traveled 120 by determining a sum of a length of each hypotenuse determined for each encrypted delta degree value from the encrypted set of delta degree values. The extraction of the total distance traveled 120 may be specified as follows:

$$D\text{ total} = \text{all}(n)\text{sqrt}(Xn^2+Yn^2)$$

The information extraction module 118 is to extract the total time 122 by determining a sum of each time delta for each encrypted delta degree value from the encrypted set of delta degree values. The extraction of the total time 122 may be specified as follows:

$$T\text{ total} = \text{all}(n)Tn$$

The information extraction module 118 is to extract the total elevation gain 124 by determining a sum of each positive elevation gain for each encrypted delta degree value from the encrypted set of delta degree values. The extraction of the total elevation gain 124 may be specified as follows:

$E$ total=all($n$)($En$ if $En$ positive, else 0)

Figure 6:
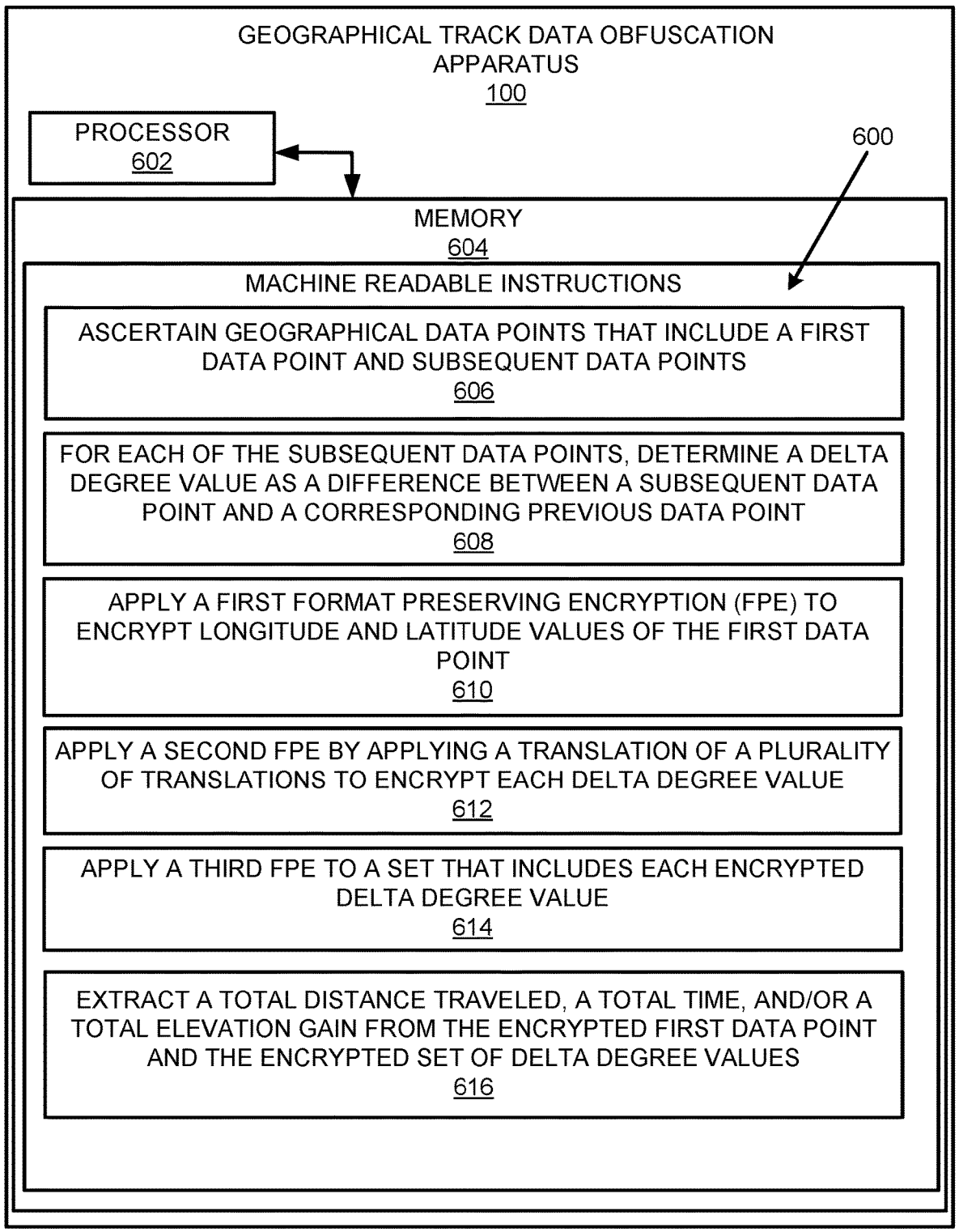
FIG. 6 illustrates an example block diagram for geographical track data obfuscation.
Figure 8:
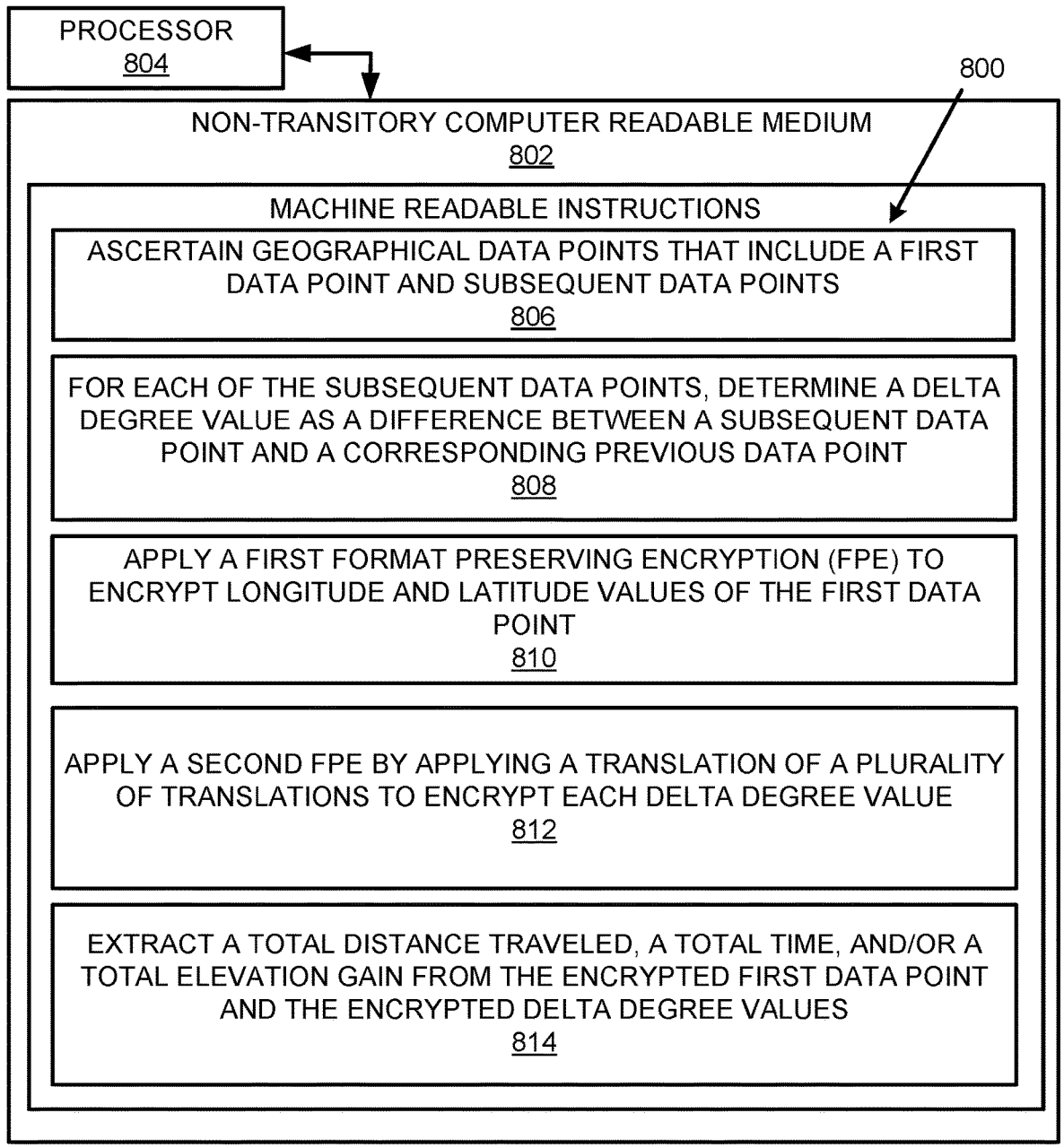
FIG. 8 illustrates a further example block diagram for geographical track data obfuscation.

FIGS. 6-8 respectively illustrate an example block diagram 600, an example flowchart of a method 700, and a further example block diagram 800 for geographical track data obfuscation. The block diagram 600, the method 700, and the block diagram 800 may be implemented on the apparatus 100 described above with reference to FIG. 1 by way of example and not limitation. The block diagram 600, the method 700, and the block diagram 800 may be practiced in other apparatus. In addition to showing the block diagram 600, FIG. 6 shows hardware of the apparatus 100 that may execute the instructions of the block diagram 600. The hardware may include a processor 602, and a memory 604 (i.e., a non-transitory computer readable medium) storing machine readable instructions that when executed by the processor cause the processor to perform the instructions of the block diagram 600. The memory 604 may represent a non-transitory computer readable medium. FIG. 7 may represent a method for geographical track data obfuscation, and the steps of the method. FIG. 8 may represent a non-transitory computer readable medium 802 having stored thereon machine readable instructions to provide geographical track data obfuscation. The machine readable instructions, when executed, cause a processor 804 to perform the instructions of the block diagram 800 also shown in FIG. 8.

The processor 602 of FIG. 6 and/or the processor 804 of FIG. 8 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 802 of FIG. 8), such as hardware storage devices (e.g., RAM (random access memory), ROM (read only memory), EPROM (erasable, programmable ROM), EEPROM (electrically erasable, programmable ROM), hard drives, and flash memory). The memory 604 may include a RAM, where the machine readable instructions and data for a processor may reside during runtime.

Referring to FIGS. 1-6, and particularly to the block diagram 600 shown in FIG. 6, the memory 604 may include instructions 606 to ascertain geographical data points 104 that include a first data point and subsequent data points.

The processor 602 may fetch, decode, and execute the instructions 608 to, for each of the subsequent data points, determine a delta degree value 108 as a difference between a subsequent data point and a corresponding previous data point.

The processor 602 may fetch, decode, and execute the instructions 610 to apply a first FPE 112 to encrypt longitude and latitude values of the first data point.

The processor 602 may fetch, decode, and execute the instructions 612 to apply a second FPE 114 by applying a translation of a plurality of translations to encrypt each delta degree value.

The processor 602 may fetch, decode, and execute the instructions 614 to apply a third FPE 116 to a set that includes each encrypted delta degree value.

The processor 602 may fetch, decode, and execute the instructions 616 to extract a total distance traveled 120, a total time 122, and/or a total elevation gain 124 from the encrypted first data point and the encrypted set of delta degree values.

Referring to FIGS. 1-5 and 7, and particularly FIG. 7, for the method 700, at block 702, the method may include ascertaining geographical data points 104 that include a first data point and subsequent data points.

At block 704 the method may include, for each of the subsequent data points, determining a delta degree value 108 as a difference between a subsequent data point and a corresponding previous data point.

At block 706 the method may include applying a first FPE 112 to encrypt longitude and latitude values of the first data point.

At block 708 the method may include applying a second FPE 114 by applying a translation of a plurality of translations to encrypt each delta degree value 108 by transforming each longitude and latitude pair of each delta degree value.

At block 710 the method may include applying a third FPE 116 to a set that includes each encrypted delta degree value.

At block 712 the method may include extracting a total distance traveled 120, a total time 122, and/or a total elevation gain 124 from the encrypted first data point and the encrypted set of delta degree values.

Referring to FIGS. 1-5 and 8, and particularly FIG. 8, for the block diagram 800, the non-transitory computer readable medium 802 may include instructions 806 to ascertain geographical data points 104 that include a first data point and subsequent data points.

The processor 804 may fetch, decode, and execute the instructions 808 to, for each of the subsequent data points, determine a delta degree value 108 as a difference between a subsequent data point and a corresponding previous data point.

The processor 804 may fetch, decode, and execute the instructions 810 to apply a first FPE 112 to encrypt longitude and latitude values of the first data point.

The processor 804 may fetch, decode, and execute the instructions 812 to apply a second FPE 114 by applying a translation of a plurality of translations to encrypt each delta degree value.

The processor 804 may fetch, decode, and execute the instructions 814 to extract a total distance traveled 120, a total time 122, and/or a total elevation gain 124 from the encrypted first data point and the encrypted delta degree values.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:
   a processor; and
   a non-transitory computer readable medium storing machine readable instructions that when executed by the processor cause the processor to:
   ascertain geographical data points that include a first data point and subsequent data points;
   for each subsequent data point of the subsequent data points, determine a delta degree value as a difference between the subsequent data point and a corresponding previous data point, wherein the delta degree value of each of the subsequent data points includes a longitude value and a latitude value;
apply a first format preserving encryption (FPE) to encrypt longitude and latitude values of the first data point to obfuscate a location of the first data point;
apply a second FPE to encrypt the delta degree value of each of the subsequent data points to change the direction of each of the subsequent data points while maintaining a same distance of the subsequent data point from the corresponding previous data point;
apply a third FPE to a set that includes the encrypted delta degree values of the subsequent data points by reordering an arrangement of the encrypted delta degree values in the set; and
extract at least one of a total distance traveled, a total time, or a total elevation gain from the encrypted first data point and the set that includes the encrypted delta degree values of the subsequent data points,
wherein the delta degree value of each of the subsequent data points of the geographical data points further includes an elevation delta with respect to the corresponding previous data point, and
wherein, to extract the total elevation gain, the instructions are executable to cause the processor to: determine a sum of the elevation delta of each encrypted delta degree value from the set that includes the encrypted delta degree values.

2. The apparatus according to claim 1, wherein, to apply the first FPE to the first data point, the instructions are executable to cause the processor to:
encrypt the longitude value of the first data point by permuting the longitude value of the first data point to a new longitude value within a range of −180 degrees to 180 degrees.

3. The apparatus according to claim 1, wherein, to apply the first FPE to the first data point, the instructions are executable to cause the processor to:
encrypt the latitude value of the first data point by permuting the latitude value of the first data point to a new latitude value within a range of 90 degrees south to 90 degrees north.

4. The apparatus according to claim 1, wherein the latitude value and the longitude value of the delta degree value of each of the subsequent data points are represented by a longitude and latitude pair (+x, +y), and
wherein, to apply the second FPE to encrypt the delta degree value of each of the subsequent data points, the instructions are executable to cause the processor to:
change the longitude and latitude pair (+x, +y) of the delta degree value of each of the subsequent data points to one of (+x, −y), (−x, −y), and (−x, +y).

5. The apparatus according to claim 1, wherein the first FPE, the second FPE, and the third FPE are each different FPEs.

6. The apparatus according to claim 1, wherein to extract the total distance traveled, the instructions are executable to cause the processor to:
determine a sum of a length of each hypotenuse determined by the longitude value and the latitude value of each encrypted delta degree value from the set that includes the encrypted delta degree values.

7. The apparatus according to claim 1, wherein the delta degree value of each of the subsequent data points of the geographical data points further includes a time delta with respect to the corresponding previous data point, and wherein to extract the total time, the instructions are executable to cause the processor to:
determine a sum of the time delta of each delta degree value from the set that includes the encrypted delta degree values.

8. The apparatus according to claim 1, wherein, to apply the second FPE to encrypt the delta degree value of each of the subsequent data points, the instructions are executable to cause the processor to: change at least one of the longitude value or the latitude value of the delta degree value of each of the subsequent data points by 180 degrees.

9. A method comprising:
ascertaining geographical data points that include a first data point and subsequent data points;
for each subsequent data point of the subsequent data points, determining a delta degree value as a difference between the subsequent data point and a corresponding previous data point, wherein the delta degree value of each of the subsequent data points includes a longitude value and a latitude value;
applying, by a processor, a first format preserving encryption (FPE) to encrypt longitude and latitude values of the first data point to obfuscate a location of the first data point;
applying, by the processor, a second FPE to encrypt the delta degree value of each of the subsequent data points to change the direction of each of the subsequent data points while maintaining a same distance of the subsequent data point from the corresponding previous data point;
applying, by the processor, a third FPE to a set that includes the encrypted delta degree values of the subsequent data points by reordering an arrangement of the encrypted delta degree values in the set; and
extracting, by the processor, at least one of a total distance traveled, a total time, or a total elevation gain from the encrypted first data point and the set that includes the encrypted delta degree values of the subsequent data points,
wherein the delta degree value of each of the subsequent data points of the geographical data points further includes an elevation delta with respect to the corresponding previous data point, and
wherein, for extracting the total elevation gain, the method comprises: determining a sum of the elevation delta of each encrypted delta degree value from the set that includes the encrypted delta degree values.

10. The method according to claim 9, wherein applying the first FPE to encrypt the longitude value of the first data point includes permuting the longitude value of the first data point to a new longitude value within a range of −180 degrees to 180 degrees.

11. The method according to claim 9, wherein applying the first FPE to encrypt the latitude value of the first data point includes permuting the latitude value of the first data point to a new latitude value within a range of 90 degrees south to 90 degrees north.

12. The method according to claim 9, wherein the method further comprises:
extracting the total distance traveled by determining a sum of a length of each hypotenuse determined by the longitude value and the latitude value of each encrypted delta degree value from the set that includes the encrypted delta degree values.

13. The method according to claim 9, wherein the delta degree value of each of the subsequent data points of the geographical data points further includes a time delta with respect to the corresponding previous data point, and
    wherein for extracting the total time, the method comprises: determining a sum of the time delta of each delta degree value from the set that includes the encrypted delta degree values.

14. The method according to claim 9, wherein applying the second FPE to encrypt the delta degree value of each of the subsequent data points includes:
    changing at least one of the longitude value or the latitude value of the delta degree value of each of the subsequent data points by 180 degrees.

15. A non-transitory computer readable medium having stored thereon machine readable instructions, wherein the machine readable instructions, when executed, cause a processor to:
    ascertain geographical data points that include a first data point and subsequent data points;
    for each subsequent data point of the subsequent data points, determine a delta degree value as a difference between the subsequent data point and a corresponding previous data point, wherein the delta degree value of each subsequent data point includes a longitude value and a latitude value;
    apply a first format preserving encryption (FPE) to encrypt longitude and latitude values of the first data point to obfuscate a location of the first data point;
    apply a second FPE to encrypt the delta degree value of each of the subsequent data points to change the direction of each of the subsequent data points while maintaining a same distance of the subsequent data point from the corresponding previous data point;
    apply a third FPE to a set that includes the encrypted delta degree values of the subsequent data points by reordering an arrangement of the encrypted delta degree values in the set; and
    extract at least one of a total distance traveled, a total time, or a total elevation gain from the encrypted first data point and the set that includes the encrypted delta degree values of the subsequent data points,
    wherein the delta degree value of each of the subsequent data points of the geographical data points further includes an elevation delta with respect to the corresponding previous data point, and
    wherein, to extract the total elevation gain, the machine readable instructions are executable to cause the processor to: determine a sum of the elevation delta of each encrypted delta degree value from the set that includes the encrypted delta degree values.

16. The non-transitory computer readable medium according to claim 15, wherein the machine readable instructions, when executed, further cause the processor to:
    apply the first FPE to encrypt the longitude value of the first data point by permuting the longitude value to a new longitude value within a range of −180 degrees to 180 degrees; and
    apply the second FPE to encrypt the delta degree value of each of the subsequent data points by changing at least one of the longitude value or the latitude value of the delta degree value of each of the subsequent data points by 180 degrees.

17. The non-transitory computer readable medium according to claim 15, wherein the delta degree value of each of the subsequent data points of the geographical data points further includes a time delta, and wherein
    to extract the total distance traveled, the machine readable instructions, when executed, cause the processor to determine a sum of a length of each hypotenuse determined by the longitude value and the latitude value of each encrypted delta degree value from the set that includes the encrypted delta degree values, and
    to extract the total time, the machine readable instructions, when executed, cause the processor to determine a sum of the time delta of each encrypted delta degree value from the set that includes the encrypted delta degree values.

18. The non-transitory computer readable medium according to claim 15, wherein the machine readable instructions, when executed, further cause the processor to:
    apply the first FPE to encrypt the latitude value of the first data point by permuting the latitude value to a new latitude value within a range of 90 degrees south to 90 degrees north.

19. The non-transitory computer readable medium according to claim 15, wherein the latitude value and the longitude value of the delta degree value of each of the subsequent data points are represented by a longitude and latitude pair (+x, +y), and
    wherein, to apply the second FPE to encrypt the delta degree value of each of the subsequent data points, the machine readable instructions are executable to cause the processor to:
    change the longitude and latitude pair (+x, +y) of the delta degree value of each of the subsequent data points to one of (+x, −y), (−x, −y), and (−x, +y).

20. The method according to claim 9, wherein the latitude value and the longitude value of the delta degree value of each of the subsequent data points are represented by a longitude and latitude pair (+x, +y), and
    wherein applying the second FPE to encrypt the delta degree value of each of the subsequent data points includes:
    changing the longitude and latitude pair (+x, +y) of the delta degree value of each of the subsequent data points to one of (+x, −y), (−x, −y), and (−x, +y).

* * * * *